US009334961B2

(12) United States Patent
Huber et al.

(10) Patent No.: US 9,334,961 B2
(45) Date of Patent: May 10, 2016

(54) COVER FOR A CYLINDER ARRANGEMENT, CYLINDER ARRANGEMENT, AND AUTOMATIC TRANSMISSION

(71) Applicant: KNORR-BREMSE Systeme fuer Nutzfahrzeuge GmbH, Munich (DE)

(72) Inventors: Christian Huber, Munich (DE); Tomas Seidl, Pleteny ujezd (CZ)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 376 days.

(21) Appl. No.: 13/924,185

(22) Filed: Jun. 21, 2013

(65) Prior Publication Data

US 2013/0284016 A1    Oct. 31, 2013

Related U.S. Application Data

(63) Continuation of application No. PCT/EP2011/073043, filed on Dec. 16, 2011.

(30) Foreign Application Priority Data

Dec. 22, 2010    (DE) .......................... 10 2010 055 694

(51) Int. Cl.
```
F15B 15/14      (2006.01)
F16J 13/00      (2006.01)
F15B 15/28      (2006.01)
```

(52) U.S. Cl.
CPC ............. *F16J 13/00* (2013.01); *F15B 15/1404* (2013.01); *F15B 15/1438* (2013.01); *F15B 15/2861* (2013.01)

(58) Field of Classification Search
CPC ............. F15B 15/2807; F15B 15/2861; F15B 15/1438; F15B 15/1433; F15B 15/1404; F15B 2201/605; F16J 13/02; F16J 1/005; B60W 10/04
USPC .................................. 91/1; 92/5 R, 169.1
See application file for complete search history.

(56) References Cited

U.S. PATENT DOCUMENTS

| | | | |
|---|---|---|---|
| 3,524,634 A | 8/1970 | Schmidt | |
| 4,471,304 A | 9/1984 | Wolf | |
| 4,726,282 A | 2/1988 | LaBair | |
| 4,998,460 A * | 3/1991 | Wolfs | F01B 11/00 60/517 |
| 7,059,238 B2 * | 6/2006 | Albright | F15B 15/1433 92/5 R |
| 7,076,841 B2 * | 7/2006 | Moller | D01H 5/525 19/266 |

(Continued)

FOREIGN PATENT DOCUMENTS

| | | |
|---|---|---|
| CN | 2055202 U | 3/1990 |
| CN | 101089406 A | 12/2007 |

(Continued)

OTHER PUBLICATIONS

International Search Report dated Mar. 20, 2012 including English-language translation (Six (6) pages).

(Continued)

*Primary Examiner* — Thomas E Lazo
(74) *Attorney, Agent, or Firm* — Crowell & Moring LLP (57) ABSTRACT

A cover is provided for a cylinder arrangement having at least one cylinder. The cover is suitable for sealingly covering a cylinder opening of the cylinder. At least one sensor unit for capturing a measurement variable within the cylinder is integrated in the cover.

11 Claims, 3 Drawing Sheets

(56) References Cited

U.S. PATENT DOCUMENTS

| | | | |
|---|---|---|---|
| 7,561,952 B2 * | 7/2009 | Steen | B60W 10/06 701/54 |
| 7,610,660 B2 | 11/2009 | Minter | |
| 2008/0087000 A1 | 4/2008 | Minter | |
| 2011/0303085 A1 | 12/2011 | Heurich et al. | |

FOREIGN PATENT DOCUMENTS

| | | |
|---|---|---|
| CN | 101161883 A | 4/2008 |
| DE | 1 259 212 B | 1/1968 |
| DE | 29 45 895 C2 | 8/1986 |
| DE | 38 07 913 C1 | 7/1989 |
| DE | 10 2006 048 742 A1 | 4/2008 |
| DE | 10 2005 029 494 B4 | 4/2009 |
| DE | 10 2009 007 657 A1 | 8/2010 |
| EP | 0 122 531 A2 | 10/1984 |
| EP | 1 867 880 A1 | 12/2007 |
| GB | 2 098 332 A | 11/1982 |
| WO | WO 2005/038270 A1 | 4/2005 |

OTHER PUBLICATIONS

International Preliminary Report on Patentability (PCT/IB/373) dated Jun. 25, 2013, including Written Opinion (PCT/ISA/237) (six (6) pages).
Chinese Office Action dated Nov. 3, 2014 (Seven (7) pages).
German Search Report dated Dec. 17, 2013 with English translation (ten (10) pages).

* cited by examiner

COVER FOR A CYLINDER ARRANGEMENT, CYLINDER ARRANGEMENT, AND AUTOMATIC TRANSMISSION

CROSS REFERENCE TO RELATED APPLICATIONS

This application is a continuation of PCT International Application No. PCT/EP2011/073043, filed Dec. 16, 2011, which claims priority under 35 U.S.C. §119 from German Patent Application No. DE 10 2010 055 694.7, filed Dec. 22, 2010, the entire disclosures of which are herein expressly incorporated by reference.

BACKGROUND AND SUMMARY OF THE INVENTION

The present invention relates to a cover for a cylinder arrangement having at least one cylinder, to a cylinder arrangement having a cover of this kind, and to an automatic transmission having a cylinder arrangement of this kind.

Cylinder arrangements are often used in the area of pneumatic or hydraulic systems. In this case, cylinder arrangements are produced in very large numbers, especially in the area of motor vehicle technology. In order to keep down production costs, it is therefore desirable to produce components of a cylinder arrangement in such a way that they can be assembled in a particularly simple and rapid manner in order to reduce production times and production costs, especially for large batches. However, manufacturing tolerances arise during the production of pneumatic or hydraulic components, and these have to be taken into account during assembly.

DE 10 2005 029 494 B4, for example, has disclosed a piston/cylinder arrangement in which a piston head is designed in such a way that an additional transmitter element for a displacement sensor can be eliminated, thereby eliminating an assembly step that would otherwise be associated therewith.

It is the underlying object of the invention to provide a cylinder-arrangement cover which can be installed easily and allows manufacturing tolerances to be compensated. Moreover, the aim is to provide a cylinder arrangement having a cover of this kind.

This and other objects are achieved according to the invention by providing a cover for a cylinder arrangement having at least one cylinder, wherein the cover is suitable for sealingly covering a cylinder opening of the cylinder, and wherein at least one sensor unit for detecting a measured variable within the cylinder is integrated at least partially into the cover. The sensor unit has a coil which is accommodated in the cover. The coil is arranged such that it at least partially surrounds and/or runs around a socket provided in the cover.

In the context of this description, a cylinder arrangement can have one or more cylinders. A cylinder can contain a fluid. Normally, a cylinder is part of a hydraulic or pneumatic system. A cylinder can accommodate a piston, which can be movable within the cylinder, e.g. by way of a piston rod connected therewith. A cylinder can have a wall structure in the form of boundary walls and can have a cylinder opening, at least on one side. This cylinder opening can expediently be closed by a cover or a cap formed separately from the wall structure. It is thus possible, during operation, to prevent fluid from entering or leaving the cylinder. A fluid can be a liquid or a gas, e.g. pneumatic oil or compressed air. The cover can have a seal and can be configured such that, in the installed state, the seal is arranged in the interior of the cylinder in order to adjoin the wall structure of the cylinder sealingly from the inside. However, it is also contemplated for the seal to be provided in the outer region of the cylinder and, for example, to surround the cylinder opening radially.

It is expedient if the wall structure of a cylinder is of substantially integral design. The cover can be formed separately from the wall structure or the cylinder. In particular, the production materials for the cylinder or cylinder wall structure and the cover can be different. For example, the cylinder or the wall structure thereof can be produced from a metallic material, such as aluminum. The cover can be produced from a plastic, in particular a thermosetting plastic or a thermoplastic. An anti-rotation safeguard can be provided between the cover and the cylinder to prevent the cover from twisting relative to the cylinder in an installed state and/or in an unfastened state.

Within the cylinder, the wall structure can define an inner region, which can also be referred to as an interior or an inside of the cylinder. The inner region can be accessible through the cylinder opening or can be bounded by the cover in an installed state. If a piston is accommodated in the interior, the inner region can be referred to as being on the piston side, in relation to a cover. Accordingly, an outer region or an outside of the cylinder can be situated outside the defined inner region. In particular, a region which lies opposite the inner region or the piston of the cylinder, in relation to the cover, can be regarded as being on the outside.

It is expedient if the cover or a seal of the cover seals off the inner region of the cylinder from the outer region. A seal can be designed as an O-ring, for example.

A cylinder arrangement or a cylinder can be provided, in particular, for a pneumatic or hydraulic system of a vehicle, such as a commercial vehicle, a truck, a rail vehicle or a tractor.

The use of a cylinder arrangement for an automatic shift transmission, e.g. for shifting the transmission by use of a pressure medium, such as compressed air, or for a brake system, in particular an air brake system, is particularly expedient.

A sensor unit can be any device suitable for providing signals based on a measured variable. In particular, a sensor device can comprise a coil or a Hall effect sensor. The measured variable can be a distance traveled by a piston and/or a piston position, for example. It is also contemplated that the measured variable should be a pressure prevailing within the cylinder. A sensor unit can be designed to detect more than one measured variable. It is contemplated for a sensor unit to have one sensor or more than one sensor.

In particular, it is expedient if the sensor unit is provided to detect the value of a measured variable in an inner region of a cylinder. A sensor unit can be designed to detect a measured variable directly or indirectly. For instance, provision can be made for the change in a magnetic field to be detected in order to infer a travel of a piston on which a magnet is secured. The sensor unit can detect a measured variable by interacting with a transmitter element. In particular, the transmitter element can be provided on a piston or within an interior of the cylinder.

It is contemplated for the sensor unit to have one or more electronic components suitable for evaluating or pre-evaluating detected signals relating to a measured variable or to have corresponding sensor electronics. A sensor unit can also be connected to external electronics, e.g. a control unit of a vehicle. In an installed state, the cover is in the position provided for it in order to close the cylinder, but it is not necessarily fastened in this position. In an uninstalled state, the cylinder and the cover are separate. A cylinder can have any desired cross section; in particular, the cross section thereof can be round, rectangular or square. The cover expediently has a cross section corresponding to the cylinder.

A cover for a cylinder arrangement having at least one cylinder, wherein the cover is suitable for sealingly covering a cylinder opening of the cylinder, and wherein at least one sensor unit for detecting a measured variable within the cylinder is integrated at least partially into the cover, is proposed. The sensor unit can be secured on or connected to the cover in a suitable manner. In particular, a nonpositive or positive connection between the cover and the sensor unit is contemplated. It is also contemplated for sensor electronics to be integrated into the cover. Partial integration can mean that part of a sensor unit, e.g. a sensor detector, projects from the cover or is not surrounded by the cover but is held by the cover. The sensor unit can also be accommodated completely in the cover, if, for example, physical contact with a medium in the interior of the cylinder is not required in order to detect the measured variable. The cover can be secured or can be capable of being secured in a suitable manner on the cylinder or on a housing or housing part arranged in a fixed spatial position relative to the cylinder. In particular, it is contemplated that the cover is a first cover of the kind described below, which is secured on a second cover, e.g. a housing cover. Integrating the sensor unit into the cover means that there is no longer any need, when assembling the cylinder arrangement, for an additional work step in which the sensor unit has to be secured on the cover or the cylinder. Assembly of the cylinder arrangement is thus made easier overall. It is also easy to ensure that the sensor unit is in the desired position.

Provision can be made for the cover to be produced at least partially from a castable material. Suitable castable materials are, for example, metals, such as aluminum, plastics or resins. Thermosetting plastics and thermoplastics, in particular, are regarded as suitable materials for the cover. The cover can be given the desired shape in a particularly simple manner by use of a casting method.

In a development, provision can be made for the sensor unit to be cast at least partially into the cover. In this way, the integration of the sensor unit into the cover can be achieved while the cover is still being shaped.

It is expedient that the sensor unit is connected or can be connected to cabling, which is passed or can be passed out of the cover on an opposite side from the sensor unit, in relation to the cover. In particular, the cabling can be passed out of the cover on the outside. Via cabling of this kind, signals can be passed to the outside from the sensor unit. The cover can have a plug connected to the sensor unit for connection to the cabling. For this purpose, the plug can be arranged on the opposite side of the cover from the sensor unit, in relation to the cover. As described above in relation to the sensor unit, the plug can be integrated at least partially into the cover. It is also contemplated that there should be radio or wireless transmission instead of transmission by cable. This can be expedient, in particular, if the cover is produced from a non-conductive material.

The cover can have a seal, which can be accommodated or is accommodated within the cylinder and is suitable for sealing off the cylinder. Thus, on the one hand, the seal can be accommodated in a space-saving manner in the cylinder. On the other hand, it is possible to mount the seal on the cover before the cover itself is installed. In this way, too, it is possible to reduce the outlay on assembly.

It is expedient if the cover has a socket for a fastening device. A socket of this kind can be in the form of a depression in the cover, for example. In particular, provision can be made for a bush accommodated in such a depression to be provided to accommodate a fastening device in the cover. Thus, for example, a bush can be provided for a screw fastener which is surrounded by cast material of the cover, for example. In particular, the socket can be arranged centrally or in the center, e.g. at a center of gravity or central point of an outer surface of the cover. It is contemplated for just one socket for a fastening device to be provided. By virtue of the fact that a centrally arranged socket is provided, uniform force distribution over the cover is achieved during fastening by use of a fastening device. The socket can be provided on the outside of the cover or on a side of the cover arranged opposite the sensor unit, in relation to the cover. The socket is thus easily accessible for installing or removing the cover. It is contemplated that a device, e.g. a housing cover or a housing part, arranged in a fixed spatial position relative to the cylinder is connected or can be connected to the cover by means of the socket and a fastening device in order to hold the cover in the desired position in the installed state. In particular, the cover can be provided with floating support in the cylinder without being secured on the cylinder. Floating support can be achieved by use of a seal of the cover supported on the wall structure. By way of a fastening device, it can be fastened or can be capable of being fastened to a structure arranged in a fixed spatial position relative to the cylinder, such as a second cover (described further below) or a housing part.

It is particularly expedient if the socket has an opening on the outside of the cylinder. It is thus possible for a fastening device to be inserted into such an opening without much assembly work.

A fastening device can have a screw or a rivet. This allows simple and reliable connection, especially when the screw or rivet is accommodated in a socket on the cover.

In particular, the sensor unit can have a coil. A coil makes it possible to produce sensor signals on the basis of induction, thereby making it possible, for example, to produce or acquire information on the travel of a piston in a simple manner.

The coil can be accommodated in the cover. In particular, the coil can be integrated completely or partially into the cover, e.g. by being cast into the cover. A coil is particularly suitable for such a casting-in process since it has no mechanical parts and gives rise to little maintenance work.

It is particularly expedient if the coil is arranged in such a way that it at least partially surrounds and/or runs around a socket provided in the cover. The socket can be one of the sockets described above and, in particular, can be arranged centrally. When arranging the coil around the socket, account may have to be taken of the fact that the socket has metal elements, such as a bush. Metal elements of this kind can have an effect on magnetic fields detected by the coil or on a current induced thereby. It may therefore be necessary to provide a suitable spacing between such metal components of the socket and/or between other metal components present in the cover and the coil. It may be expedient to calibrate the sensor unit and/or sensor electronics associated with the sensor unit while allowing for metal components in the cover.

A cylinder arrangement having a cover of the kind described above can be provided. In particular, provision can be made for a cover of this kind to be provided with floating support in a cylinder. In this case, it can be held in position relative to the cylinder by a seal. Of course, it is also possible for the cylinder arrangement to comprise a plurality of cylinders, each of which is provided with a suitable cover. It is not necessary in this context for each cylinder to be provided with a cover described above. In particular, it is possible for some of the cylinders not to be provided with a sensor unit. Several cylinders can be covered by a single integrally formed cover which has at least one integrated sensor unit as described above.

An automatic transmission for a vehicle having a cylinder arrangement of this kind is furthermore provided.

A covering device for a cylinder arrangement having at least one cylinder is furthermore proposed, wherein the covering device has a first cover, which is accommodated or can be accommodated at least partially in the cylinder in order to cover a cylinder opening of the cylinder in a sealing manner. The covering device has a second cover, which is suitable for covering the first cover in such a way that a first clearance is formed between the cylinder and the second cover. The covering device furthermore has a fastening device, which is designed to fasten the first cover to the second cover. The first cover can be a cover of the kind described above in connection with a sensor unit. The first cover can have each feature of the cover described above, either individually or in any desired combination. Thus, it is also contemplated for a first cover to be designed like one of the covers described above without having an integrated sensor unit. The first clearance between the cylinder and the second cover can be provided on the basis of tolerances during production. The first clearance can be restricted to certain regions between the second cover and the cylinder. In particular, it is possible for the second cover to rest directly on the cylinder in certain regions, while there is a clearance between the cylinder or a rim of the wall structure of the cylinder and the second cover in other regions. By use of the covering device described, it is possible to achieve easy assembly, during which manufacturing tolerances are compensated in a simple manner. The second cover can impart additional stability and reinforcement to the first cover, allowing even a relatively light cover to withstand the pressures prevailing in a pneumatic or hydraulic cylinder. The first cover can be provided with floating support relative to the cylinder. In particular, it is contemplated for the first cover to be fastened only to the second cover by way of the fastening device, but not to the cylinder. As described above, the first cover can be made from a plastics material. The second cover can be produced from a metallic material, e.g. aluminum or steel. The second cover can be part of a housing or can be a housing cover. Thus, during assembly, the first cover can be introduced into the cylinder without the need for complicated fastening on the cylinder. The second cover can be designed to cover more than one cylinder or more than one first cover. In this case, first covers of different designs can be covered by a common second cover. It is not necessary here for each first cover to have a sensor unit.

The first cover can have a first socket for the fastening device. The first socket can be provided in a central region or centrally in the first cover. The first socket can face the outside of the cylinder. It is thus possible to fasten the first cover to the second cover in a simple manner by introducing the fastening device into the socket.

The fastening device can comprise a screw or a rivet. A fastening device of this kind allows easy assembly.

The second cover can have a second socket for the fastening device. Thus, the second cover can be set up for easy assembly. It is contemplated for a fastening device to be provided on the first cover. For example, a projecting structure, such as a screw without a screw head, can project on the outside from the first cover. The second cover can be mounted or be capable of being mounted on the projecting structure in such a way that the projecting structure is accommodated in the socket of the second cover. Irrespective of the direction in which a fastening device can be introduced into the second socket, the second socket can have an opening passing through the second cover. Thus, a fastening device, such as a screw or rivet, can be passed through the second cover and can either be introduced into a first socket of the first cover or can be connected on the outside to the second cover or fastened to the latter, e.g. by means of a nut or by staking a rivet.

The first socket and/or the second socket can comprise a bush. A bush of this kind can be made of metal, for example, in order to provide the socket with improved rigidity for securing the fastening device.

In the installed state, the second cover can project at least partially out of a cylinder wall structure surrounding the cylinder opening of the cylinder. In particular, provision can be made for the second cover to be supported at least partially on a cylinder rim or a rim of a cylinder wall structure. A second cover can be regarded as projecting partially out of the cylinder wall structure if it projects over part of the circumference of the cylinder wall structure. Thus, on the one hand, the second cover can be secured easily on a structure arranged in a fixed spatial position relative to the cylinder and, on the other hand, can perform additional functions. For example, the second cover can also provide a dirt seal.

It may be expedient for a second clearance, smaller than the first clearance, to be formed between the first cover and the second cover in the installed state. This enables the second cover to have a particularly good stabilizing effect on the cover. It is particularly expedient if the second clearance is made as close as possible to zero. For example, the first cover can lie as close as possible to the second cover. This can be accomplished, for example, by screwing the first cover onto the second cover in a suitable manner.

In this context, a cylinder arrangement with a covering device of the kind described above is proposed.

A method for installing a covering device for a cylinder arrangement is furthermore described. The covering device can be one of the covering devices described above. The method has the following steps: fixing the first cover into the cylinder; covering the first cover by the second cover; and fastening the first cover to the second cover by use of the fastening device. In covering the first cover with the second cover, provision can be made for the second cover to be placed on a fastening device projecting from the first cover, e.g. by passing the fastening device into or through a second socket of the second cover. The projecting fastening device can be a screw-type structure or a rivet-type structure, for example. During the fastening process, riveting or, for example, screw fastening by means of a screw nut can then take place. It is also contemplated for a fastening device to be introduced into the second cover in the direction of the first cover so as to be accommodated in a first socket of the first cover. In this way, fastening of the first cover to the second cover can take place entirely from the outside. As the first cover is fitted into the cylinder, floating support for the first cover can be provided in the cylinder. In particular, it is possible for the first cover not to be secured on the cylinder or within the cylinder. This makes it possible for the first cover to be aligned in a suitable way as the first cover is fastened to the second cover. Before the first cover is fastened to the second cover, the second cover can be fastened to a structure arranged in a fixed spatial position around the cylinder.

The covering of the first cover by use of the second cover can be carried out in such a way that a first clearance is formed between the cylinder and the second cover. For the first clearance between the second cover and the cylinder, the above statements apply. Thus, it is possible to compensate for manufacturing tolerances which occur particularly when the second cover is not fastened to the cylinder but to some other structure.

The fastening of the first cover to the second cover can be carried out in such a way that a second clearance is formed between the first cover and the second cover which is smaller than the first clearance. In particular, the second clearance can be as small as possible. Thus, on the one hand, compensation of manufacturing tolerances is made possible and the first cover is supported and additionally reinforced by the second cover. On the other hand, good sealing of the cylinder by the first cover is ensured.

During the fastening process, the first cover can be tightened on the second cover. Tightening can be accomplished, in particular, by use of the fastening device, e.g. in screwing the first cover to the second cover. Provision can be made here for the second cover to be supported on a structure which is spatially fixed relative to the cylinder and/or on the cylinder, e.g. on a rim of the wall structure surrounding the opening of the cylinder. At the same time, it must be ensured that the first cover or the seal thereof still enters sufficiently far into the cylinder to provide reliable sealing of the cylinder in the state of maximum proximity of the first cover and the second cover.

Other objects, advantages and novel features of the present invention will become apparent from the following detailed description of one or more preferred embodiments when considered in conjunction with the accompanying drawings.

DETAILED DESCRIPTION OF THE DRAWINGS

In the text which follows, identical reference signs are used for elements which are substantially the same or have the same function.

Figure 1:
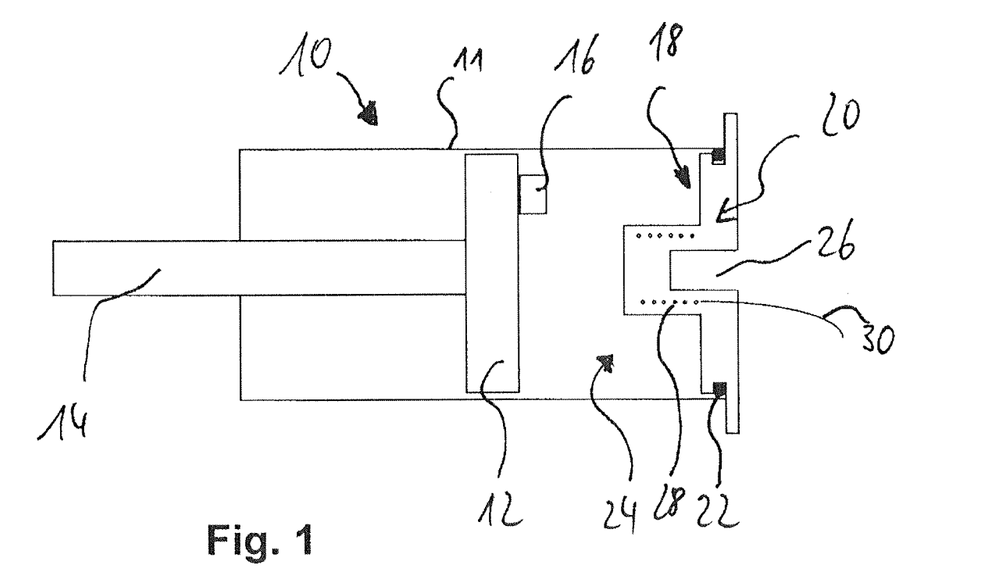
FIG. 1 shows a cylinder arrangement having a cover with a sensor unit.

FIG. 1 shows a cylinder 10 of a cylinder arrangement, in which a piston 12 is accommodated. The piston 12 can be moved within the cylinder 10 by means of a piston rod 14. A transmitter element 16 in the form of a magnet is provided on the piston 12. The piston 12 can be sealed off relative to a wall structure 11 of the cylinder 10 in a suitable manner (not shown). The cross section of the cylinder 10 can have any suitable shape: for example, the cylinder can have a round, square or rectangular cross section. The piston expediently has a corresponding cross section.

A cylinder opening 18 is provided in the cylinder 10. A cover 20 closes the cylinder opening. The cover 20 is sealed off relative to the cylinder 10 by way of a seal 22. Together with the wall structure 11 of the cylinder 10, the cover 20 defines an interior 24 of the cylinder 10. The piston 12 can move in this interior 24. The interior 24 is sealed off relative to an outer side of the cylinder 10 by the cover 20 and the seal 24 thereof. In the example shown here, the cover 20 projects at least partially beyond the surrounding wall structure 11 of the cylinder 10 and is supported on the surrounding wall structure 11 in the direction of the interior 24 of the cylinder 10. However, it is also contemplated for the cover 20 to be accommodated completely within the cylinder.

As an alternative or in addition, it is contemplated for a seal arranged radially to the outside of the surrounding wall structure 11 of the cylinder 10 to be provided.

The cover 20 furthermore has a socket 26, into which a fastening device, such as a screw or a rivet, can be introduced. A bush made of rigid, in particular metallic, material can be provided in the socket 26. The cover 20 can be composed of an airtight or fluidtight material, in particular of a thermosetting plastic or a thermoplastic.

A sensor unit 28 is integrated into the cover 20. In this example, the sensor unit 28 comprises a coil, which is cast into the material of the cover 20. The coil at least partially surrounds the socket 26. In order to pass signals to the outside from the sensor unit 28, cabling 30 is provided, which is passed to the outside of the cover 20. The coil of the sensor unit 20 interacts with the transmitter element 16 provided on the piston 12 in order to produce signals, from which the position or movement of the piston 12 can be determined. By means of the seal 22, the cover 20 provides a pneumatic closure of the pneumatic cylinder 10.

Figure 2:
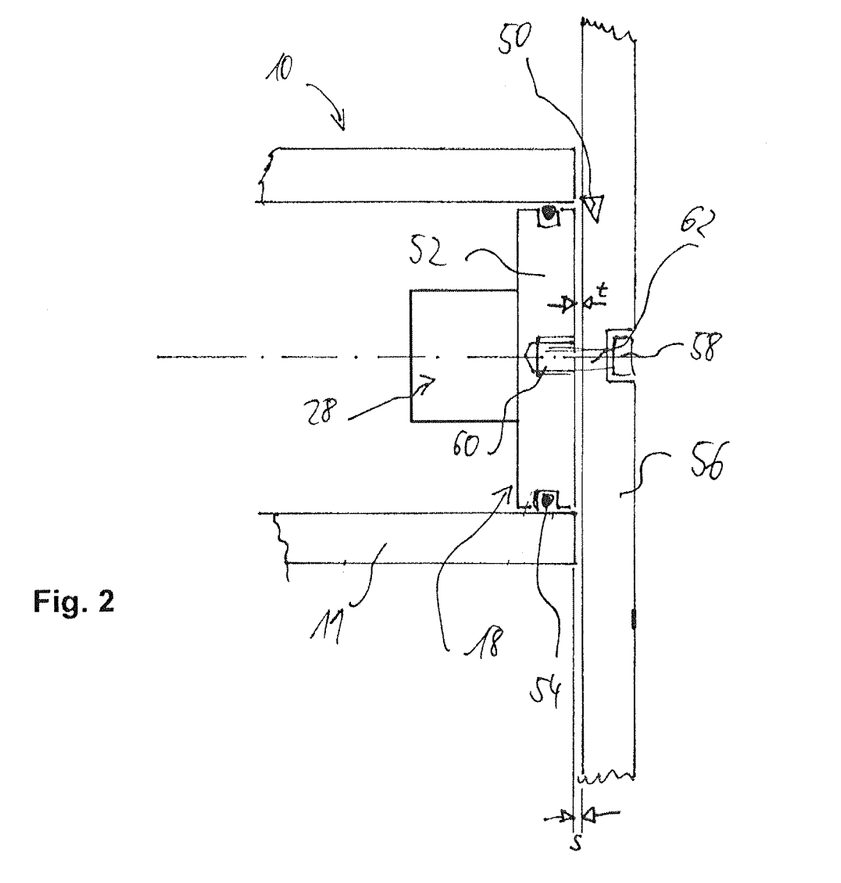
FIG. 2 shows a cylinder arrangement having a covering device.

FIG. 2 shows a cylinder arrangement having a cylinder 10, which, in a manner similar to that shown in FIG. 1, can have a piston or a piston rod (not shown). The cylinder 10 has a cylinder opening 18. The opening 18 of the cylinder 10 is covered by a covering device 50. The covering device 50 includes a first cover 52, which is produced from a thermosetting plastic or a thermoplastic. The first cover 52 is accommodated within the cylinder 10 and is provided with floating support relative to the cylinder 10. The first cover 52 has a seal 54, which provides a seal between the first cover and the wall structure 11 of the cylinder 10 and offers the floating support.

The first cover 52 is fastened to a second cover 56 of the covering device 50 by way of a fastening device 58. For this purpose, the fastening device 58 is accommodated in a first socket 60 of the first cover 52. The first socket 60 can have a bush in order to offer better fastening of the fastening device 58. The fastening device 58 can include a screw or a rivet.

It is contemplated for the first cover 52 to have an integrated sensor unit 28 (shown schematically here), like the cover shown in FIG. 1. In this case, provision can be made for the second cover 56 to have a socket (not shown), via which a cable can be passed outward from the sensor unit 28. The second cover 56 furthermore has a second socket 62, which passes through the second cover 56, allowing the fastening device 58 to be passed through the second cover 56 into the first cover 52 from the outside. It is expedient if the first socket 60 is embodied in such a way that it does not pass completely through the first cover 52, thus ensuring that the sealing properties of the first cover 52 are not compromised. A first clearance "s" is formed between the wall structure 11 of the cylinder 10 and the second cover 56. This clearance "s" is due to manufacturing tolerances and cannot be reduced since the second cover 56 is fastened to a structure outside the cylinder 10 and, in general, cannot be aligned in such a way relative to the cylinder 10 that the clearance s disappears. A second clearance t, which is smaller than the clearance s, is formed between the first cover 52 and the second cover 56. In particular, the first cover 52 can be tightened onto the second cover 56 by way of the fastening device during installation in order to make the clearance t as small as usual or to reduce it to zero. It can be seen that the second cover 56 projects and continues beyond the wall structure 11 of the cylinder 10. The second cover 56 can be fastened to a housing part or a holding device (not shown) arranged in a fixed spatial position relative to the cylinder 10. It is contemplated for the second cover 56 to be continued in order to cover one or more further cylinders so as to serve as a first or second cover or housing cover for said cylinders.

Figure 3:
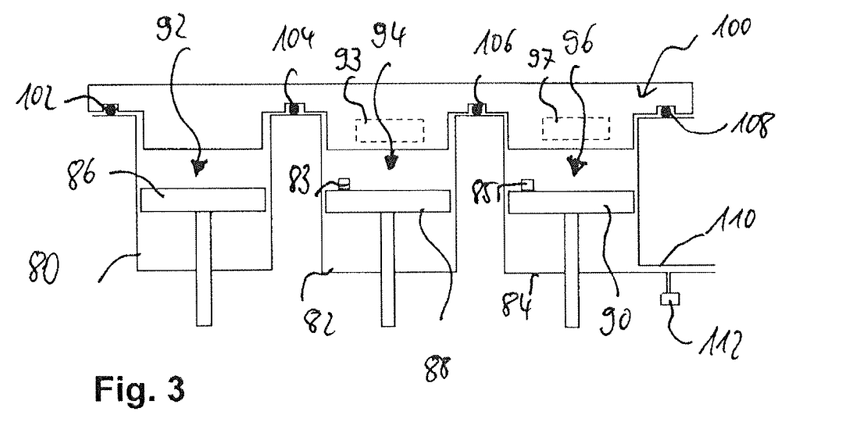
FIG. 3 shows a cylinder arrangement having a plurality of cylinders with a common cover.

FIG. 3 shows an example of a cylinder arrangement having a plurality of cylinders 80, 82 and 84, to which pistons 86, 88 and 90, respectively, are assigned. Each of the cylinders 80, 82, 84 has an associated opening 92, 94 and 96 respectively.

The openings 92, 94 and 96 are covered by a common covering device 100. In this example, the covering device 100 furthermore has seals 102, 104, 106 and 108, which are provided so as to give a radial sealing action on the outside of the cylinders. FIG. 3 furthermore shows a fluid outlet 110 associated with cylinder 84, at which an external sensor device 112 can be provided, for example. A sensor device of this kind can be used, for example, to determine a pressure within cylinder 84. Respective transmitter elements 83, 85 are provided on the pistons 88, 90 of cylinders 82 and 84. Each transmitter element 83, 85 is assigned a sensor unit 93, 97, which is integrated into the cover 100. No sensor unit is provided for cylinder 80, and therefore the cover 100 comprises just two sensor units, which are integrated into the cover 100. As an alternative to the integral covering device 100 shown, provision can be made for one or more than one of the cylinders 80, 82, 84 to be covered by a first cover 52 of the kind described, for example, in FIG. 2. A common covering device 100 can then serve, for example, as a second cover in relation to the respective first cover assigned to one of the cylinders, the first cover thus in each case being accommodated in a floating manner in relation to the cylinder and only being fastened to the second cover by a suitable fastening device.

LIST OF REFERENCE SIGNS 10 cylinder
11 cylinder wall structure
12 piston
14 piston rod
16 transmitter element
18 cylinder opening
20 cover
22 seal
24 interior of cylinder
26 socket
28 sensor unit
30 cabling
50 covering device
52 first cover
54 seal
56 second cover
58 fastening device
60 first socket
62 second socket
80 cylinder
82 cylinder
83 transmitter element
84 cylinder
85 transmitter element
86 piston
88 piston
90 piston
92 cylinder opening
93 sensor unit
94 cylinder opening
96 cylinder opening
97 sensor unit
100 covering device
102 seal
104 seal
106 seal
108 seal
110 fluid outlet
112 external sensor device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component of a cylinder arrangement having at least one cylinder, comprising:
    a cover operatively configured to sealingly cover a cylinder opening of the cylinder;
    a sensor unit integrated at least partially into the cover, the sensor unit being configured to detect a measured variable within the cylinder; and
    a fastener for the cover, wherein
        a socket is formed in the cover, the socket accommodating the fastener, and
        the sensor unit comprises a coil accommodated in the cover, the coil being arranged to at least partially surround the socket.

2. The component according to claim 1, wherein the cover is made of a cast cover material.

3. The component according to claim 2, wherein the sensor unit is cast at least partially into the cast cover material.

4. The component according to claim 3, further comprising: a cable arranged to pass out of the cover on an opposite side from the sensor unit in relation to the cover, the cable being connectable with the sensor unit.

5. The component according to claim 1, further comprising: a cable arranged to pass out of the cover on an opposite side from the sensor unit in relation to the cover, the cable being connectable with the sensor unit.

6. The component according to claim 1, further comprising: a seal operatively configured to seal-off the cylinder from the outside, the seal being arranged in an interior region of the cylinder.

7. The component according to claim 1, wherein the socket has an opening facing the outside of the cylinder.

8. A cylinder arrangement, comprising:
    a plurality of cylinders having cylinder openings; and
    a cover for the cylinder arrangement, the cover being operatively configured to sealingly cover the cylinder openings of the cylinders; and
    a fastener for the cover, wherein
        a socket is formed in the cover and is configured to accommodate the fastener, and
        a sensor unit for detecting a measured variable within at least one cylinder is integrated at least partially into the cover; wherein the sensor unit comprises a coil accommodated in the cover, the coil being arranged so as to partially surround the socket.

9. The cylinder arrangement according to claim 8, wherein the cover is made of a cast cover material.

10. The cylinder arrangement according to claim 9, wherein the sensor unit is cast at least partially into the cover.

11. A vehicle, comprising:
    an automatic transmission having a cylinder arrangement; wherein the cylinder arrangement includes a plurality of cylinders having cylinder openings;
    a cover for the cylinder arrangement, the cover being operatively configured to sealingly cover the cylinder openings of the cylinders; and
    a fastener for the cover, wherein
        a socket is formed in the cover and is configured to accommodate the fastener, a sensor unit for detecting a measured variable within at least one cylinder is integrated at least partially into the cover, and the sensor unit comprises a coil accommodated in the cover, the coil being arranged so as to partially surround the socket.

\* \* \* \* \*